United States Patent [19]

Kuijk et al.

[11] Patent Number: 4,723,171
[45] Date of Patent: Feb. 2, 1988

[54] ELECTROSCOPIC FLUID PICTURE-DISPLAY DEVICE SUITABLE FOR DISPLAYING TELEVISION IMAGES

[75] Inventors: Karel E. Kuijk; Cornelis M. Hart, both of Eindhoven, Netherlands

[73] Assignee: U.S. Philips Corporation, New York, N.Y.

[21] Appl. No.: 784,914

[22] Filed: Oct. 4, 1985

[30] Foreign Application Priority Data

Oct. 10, 1984 [NL] Netherlands .................. 8403077

[51] Int. Cl.$^4$ .............................................. H04N 9/12
[52] U.S. Cl. .................................... 358/230; 340/788
[58] Field of Search .................. 358/56, 59, 230, 241; 340/783, 787, 788

[56] References Cited

U.S. PATENT DOCUMENTS

| | | | |
|---|---|---|---|
| 2,595,617 | 5/1952 | Toulon | 358/56 |
| 3,748,378 | 7/1973 | Garrison | 358/230 |
| 3,924,228 | 12/1975 | Goodrich | 340/336 |
| 4,519,676 | 5/1985 | Te Velde | 340/763 |

*Primary Examiner*—Tommy P. Chin
*Attorney, Agent, or Firm*—Thomas A. Briody; Jack Oisher; William J. Streeter

[57] ABSTRACT

An electroscopic fluid picture-display device suitable for display television images and operating with pulse duration modulation. A picture signal sample-and-hold circuit (S/H) is followed by a pulse duration modulator (UG, DE) which comprises a first electrode (E1), a second electrode (E2) and an interposed, movable third electrode (E3) of display elements (DE) of the device (EFD, UG). The second electrode of each element is coupled to a corresponding picture voltage sampling output. The third electrode, which is interconnected with all elements, receives from a control voltage generator (UG) a control voltage (SE3) which varies over the television field period and includes a reset pulse for resetting the third to the second electrode and thereafter has a linearly decreasing control voltage. The first electrode, which is common to all elements, is thereby supplied during the field period with a constant control voltage (SE1). Both control voltages have the same polarity and the pulse voltage is approximately equal to the constant voltage. Periodically, at least once per field period, the polarity of at least the control voltages (SE1, SE3) is reversed. These control voltages may during the field period be alternating or direct voltages. The result of the given voltage supply is that the supplied television picture signal (PS) with an inherent direct voltage component does not impair the fluid (F) and hence does not interfere with the picture display with electrolysis or with charge accumulation involving electrical charging and discharging effects.

9 Claims, 8 Drawing Figures

ELECTROSCOPIC FLUID PICTURE-DISPLAY DEVICE SUITABLE FOR DISPLAYING TELEVISION IMAGES

BACKGROUND OF THE INVENTION

The invention relates to an electroscopic fluid picture-display device provided with display elements arranged in a panel in the form of a matrix of rows and columns, and with a control voltage generator. The display elements each have a first and a second electrode and between them a third electrode that can be moved in a fluid, and the control voltage generator for supplying control voltages is coupled to the electrodes. Depending on the value of the voltage on the movable third electrode relative to that of the first and second electrode, the third electrode is located near the first or to the second electrode. At least one of the three voltages for each display element results in a pulse duration modulation during the display which depends on the value of a video signal to be displayed by television means. To this end the device is provided with a sample-and-hold circuit for the video signal and with a pulse duration modulator following it.

Such a picture-display device is disclosed in Netherlands patent application No. 82 00 354. As a passive display the device operates with ambient light. Use can thereby be made of the reflection or transmission of light by known methods. Light reflection is described whereby light is reflected by the reflecting third electrode when located near to the transparent first electrode, and light is absorbed in an opaque fluid in the display element when the third electrode is close to the second electrode. The first electrodes may be made to serve as a common upper electrode for all display elements, the second electrodes as strip-shaped lower electrodes lying in the row direction, and the third movable electrodes in between providing the electrical interconnection in the column direction. By means of the sample-and-hold circuit and the pulse duration modulator, the third electrode is situated close to the first electrode during a part of a television field period or of a frame period in interlaced television, and is situated during the remaining part of the period close to the second electrode, which parts of the period depend on the local picture signal value. For the pulse duration modulator a clock pulse counter is proposed which, depending on the stored picture signal value, determines the part of the field period in which the third electrode is driven. The result is a television picture with many luminance levels for display.

The pulse duration modulation, depending on the picture signal value, can be a good solution for an electroscopic picture-display device suitable for television with many luminance levels. However, the use of a fluid in the display elements can give rise to problems. For instance, the fluid may be subject to electrolysis when a direct voltage component is present between adjacent electrodes. The products of the electrolysis may lead directly or after some time to an unacceptable change in the properties of the fluid. Another problem is that the direct voltage components between the electrodes may lead to charge accumulation, producing electrical charging and discharging effects in the fluid which may unacceptably affect the position and speed of displacement of the movable third electrode. Since television picture signals contain, in the known way, direct voltage components that depend on the content of the picture signal, pulse duration modulation cannot straightforwardly be applied in electroscopic picture-display devices that contain display elements filled with a fluid, if the fluid may be affected by direct voltages.

SUMMARY OF THE INVENTION

The object of the invention is to provide an electroscopic picture-display device with display elements that are filled with a fluid that can be influenced by direct voltage, which device is suitable for use in television with the supply of picture signals having direct voltage components. An electroscopic picture-display device in accordance with the invention has a pulse duration modulator and which comprises the first, second and third electrodes of the display element. The second electrode is coupled to a corresponding video output of the sample-and-hold circuit for supplying the picture signal sample to be locally displayed, the third electrode interconnected with all display elements being coupled to an output of the control voltage generator for supplying a control voltage that varies over the field period. A reset pulse for resetting the third electrode to the second electrode is followed by a more or less linearly decreasing control voltage. The first electrode, which is common to the display elements, is coupled to an output of the control voltage generator for supplying a more or less constant control voltage, which control voltages originate from the control voltage generator and have the same polarity. The reset pulse voltage is more or less equal to the constant control voltage, whereby periodically, by at least one field period, the polarity of at least the control voltages is reversed.

The pulse duration modulation, taking place after the resetting, with the picture voltage sample on the second electrode, with the decreasing control voltage on the third electrode and with the constant control voltage of the same polarity on the first electrode, together with the periodic reversal of the polarity of at least the two control voltages, prevents the direct voltage component of the picture signal from having any disturbing effect on the fluid in the display element.

To implement the sample-and-hold circuit in a simple manner, the more or less linearly decreasing control voltage and the constant control voltage can both be an alternating voltage over the field period with the same frequency and polarity. The sample-and-hold circuit can thereby supply the picture voltage samples with only one polarity.

To avoid the use of control alternating voltages is characterized in that the more or less linearly decreasing control voltage and the constant control voltage can both be a direct voltage over the field period, whereby the sample-and-hold circuit provides the picture voltage samples with the periodic reversal of polarity taking place at least once per field period.

A polarity reversal that is simple to implement in the video signal processing can be realized in an embodiment of the device where the sample-and-hold circuit is preceded by a periodic picture-signal inverter which periodically reverses the polarity as aforesaid at least once per field period.

For a simple means of driving the second electrode the sample-and-hold circuit can be provided with a cross-bar system of connections crossing each other in rows and columns, which operates with row selection and sequential supply of the picture signals to the columns capacitances are present at the cross points and carry the picture voltage samples which are each coupled via an output of the circuit to the corresponding second electrode.

For polarity reversal which is simple to implement the control voltage generator can contain a frequency divider which is provided with an input for receiving a television field-synchronising signal, and with an output for supplying a signal with the said periodic polarity reversal, taking place at least once per field period.

For alternating voltage application the control voltage generator can be provided with an alternating voltage generator and a generator for supplying the control voltage that varies over the field period, which generators have a television field synchronisation. A multiplier is present with inputs that are coupled to the outputs of the alternating voltage generator and the frequency divider and of which an output is coupled to the first electrode of the display elements. A further multiplier is present with inputs that are coupled to the outputs of the generator for supplying the control voltage that varies over the field period, of the frequency divider and of the alternating voltage generator and of which an output is coupled to the third electrode of the display elements.

Another embodiment suitable for the alternating voltage application is characterized in that the capacitances are each present in a corresponding switching circuit by means of which one or the other capacitance terminal with the picture-voltage sample of reversed polarity is coupled to the corresponding output. For the purpose of receiving a switching signal having the polarity reversal period, the switching circuit is coupled to an output of the frequency divider.

For the direct voltage application the control voltage generator can have a generator for supplying the control voltage that varies over the field period, which generator has a television field synchronisation. A multiplier is present with inputs that are coupled to the outputs of the generator and of the frequency divider. The output of the frequency divider is coupled to the first electrode of the display elements and the output of the divider is coupled to the third electrode of the display elements.

DETAILED DESCRIPTION OF THE PREFERRED EMBODIMENT

Figure 1:
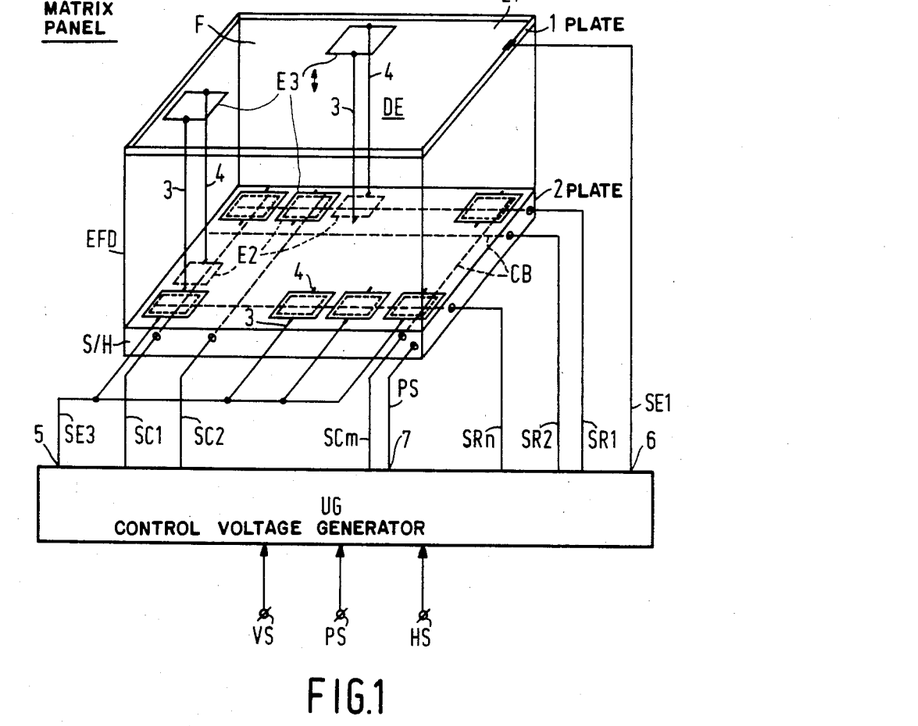
FIG. 1 is a schematic drawing of an electroscopic television-picture display device suitable for the application of the invention.

In the schematically drawn embodiment of an electroscopic fluid picture-display device of the invention as shown in FIG. 1 a matrix panel is denoted by EFD and a control voltage generator by UG. Between two plates 1 and 2 the matrix panel EFD has an enclosed space in which a fluid F is present. The fluid F is an opaque liquid which is capable of being influenced by direct voltages across it and occurring inside it. The influencing may consist of electrolysis or of charge accumulation with electrical charging and discharging effects in the fluid.

On each of the plates 1 and 2 there is within the space containing the fluid F a further electrically insulating layer (not indicated). The plate 1 is transparent and contains above the insulating layer an electrically conducting layer E1, which serves as a first electrode. Under the insulating layer near the plate 2 there are second electrodes E2 which are electrically insulated from each other. Third electrodes denoted by E3 are contained in the fluid F and can be displaced therein between the plates 1 and 2. The electrodes E3 are diffuse reflectors on the side facing the electrode E1 to the said insulating layer and are connected to the plate 2 by resilient elements 3 and 4. On the basis of the electrodes E3 (and E2) arranged in a matrix of rows and columns, the resilient connections 3 and 4 provide for a voltage supply to the electrodes E3 in the direction of the columns. It would also be possible to arrange for a voltage supply in the direction of the rows or a combination of both. In the embodiment shown the column through-connections 3 and 4 lead outside the matrix panel EFD and are together coupled to an output 5 of the control voltage generator UG. Instead of being connected to the plate 2 the resilient connections 3 and 4 could be connected to the plate 1, but points of connection on the plate 1 should be transparent. Instead of resilient connecting elements 3 and 4, these may be implemented with a leaf spring clamped at one end or with a stiff leaf which is connected to a spring or springs and can be tilted to one side. Also conceivable are electrically conducting guide rods between the plates 1 and 2, between which rods one or more electrodes E3 can be displaced in the indicated direction. Irrespective of the specific embodiment of the movable electrodes E3, it is important only that the same voltage be applied to all electrodes E3, which is indicated in FIG. 1 by SE3 at an output 5 of the control voltage generator UG.

The electrodes E1, E2 and E3 together form display elements DE in the matrix panel EFD. Each display element DE comprises a part of the common first electrode E1, its own second electrode E2 with its own voltage supply to be further specified, and its own third electrode E3 with the common control voltage SE3. The control voltage generator UG delivers to an output 6 a control voltage SE1 for supply to the electrode E1. For the separate voltage supply to each electrode E2 the matrix panel EFD is provided with a sample-and-hold circuit S/H which is present in the plate 2. The circuit S/H comprises a cross-bar system CB which has crossbars in the directions of the rows and columns of the display elements DE. It will be shown that the crossbar system CB operates with row selection performed by means of control voltages SR1, SR2 up to and including SRn supplied by the generator UG, and with sequential column information supply controlled by control voltages SC1, SC2 up to and including SCm supplied by the generator UG. Belonging to this is a matrix panel EFD with n rows and m columns of display elements DE. The column information consists of a television picture signal PS to be reproduced by line and field scanning and which is delivered by the generator UG to an output 7 for supply to the circuit S/H. For this purpose the control voltage generator UG is supplied with the television picture signal PS and a television field and line synchronisation signal VS and HS respectively. The generator UG can deliver the picture signal voltage PS direct to the output 7 or with a periodic reversal of polarity yielding a signal sequence PS, $\overline{PS}$.

Figure 2:
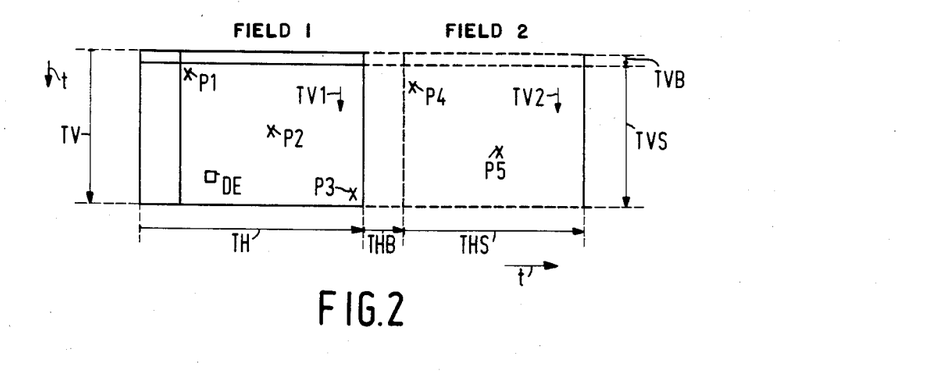
FIG. 2 shows, by way of simplifying the explanation of the invention, a possible television signal waveform as a function of time.

FIG. 2 shows a possible television signal waveform as a function of time t. TV denotes a television field period which comprises a field scan duration TVS and a field blanking duration TVB. Line periods occurring in the field period TV are denoted by TH, with THS denoting a line scan duration and THB a line blanking duration. Picture information for display occurs in the durations TVS and THS. FIG. 2 shows some examples of local video information during two successive field periods TV1 and TV2. P1, P2 and P3 denote three image points (pixels) occurring approximately at the beginning, in the middle and at the end of the duration TVS of the field period TV1. The image points P each correspond to a display element DE of FIG. 1. P4 and P5 denote image points of the field period TV2, which by way of example in the display television picture lie a few television lines lower than the image points P1 and P2. Here the field periods TV1 and TV2 correspond to an interlaced television picture as in a television standard, or non-interlaced television may be applied. With single interlaced television the picture information of odd and even numbered television lines occurs respectively in the field periods TV1 and TV2. In non-interlaced television the television line scans are identical in the field periods TV.

Figures 3, 6:
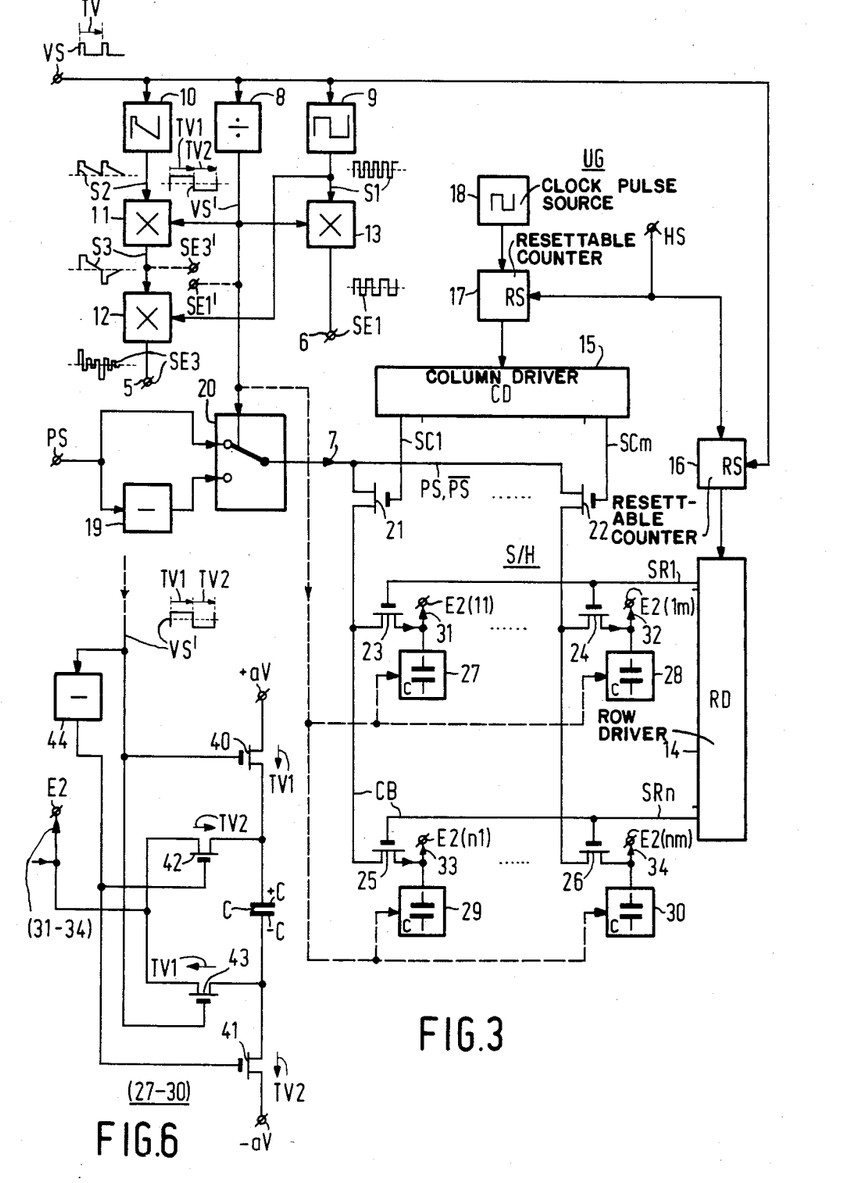
FIG. 3 shows a circuit diagram for a control voltage generator and a sample-and-hold circuit.
FIG. 6 shows a more detailed embodiment of parts of the sample-and-hold circuit of FIG. 3, with the possibility of reversing the polarity of the picture signal sample.
Figure 4:
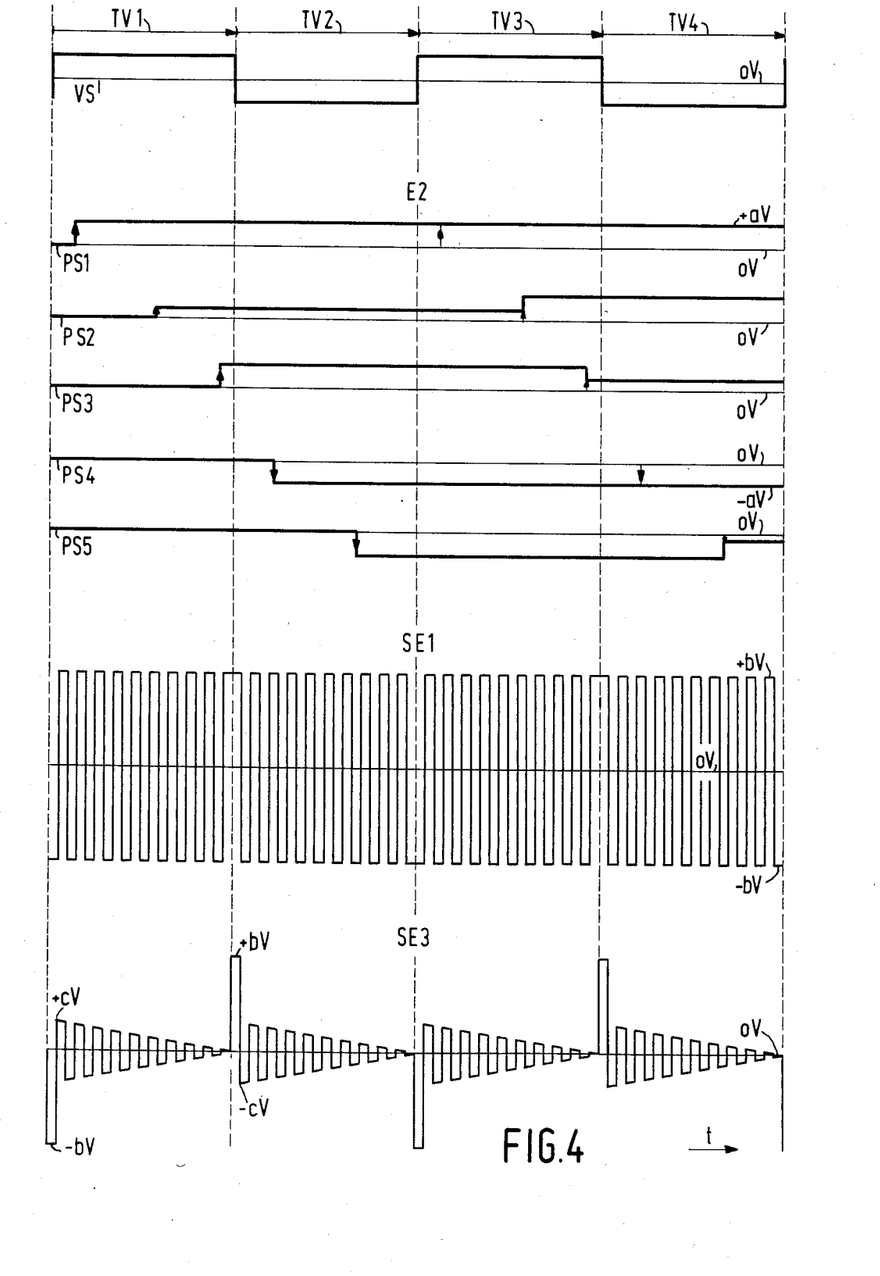
FIG. 4 shows some voltage waveforms as a function of time to illustrate the operation of the device in FIG. 1 and of the circuit diagram in FIG. 3, FIGS. 5a and 5b show time diagrams of closely cooperating voltages and of resulting electrode displacements.
Figure 5A:
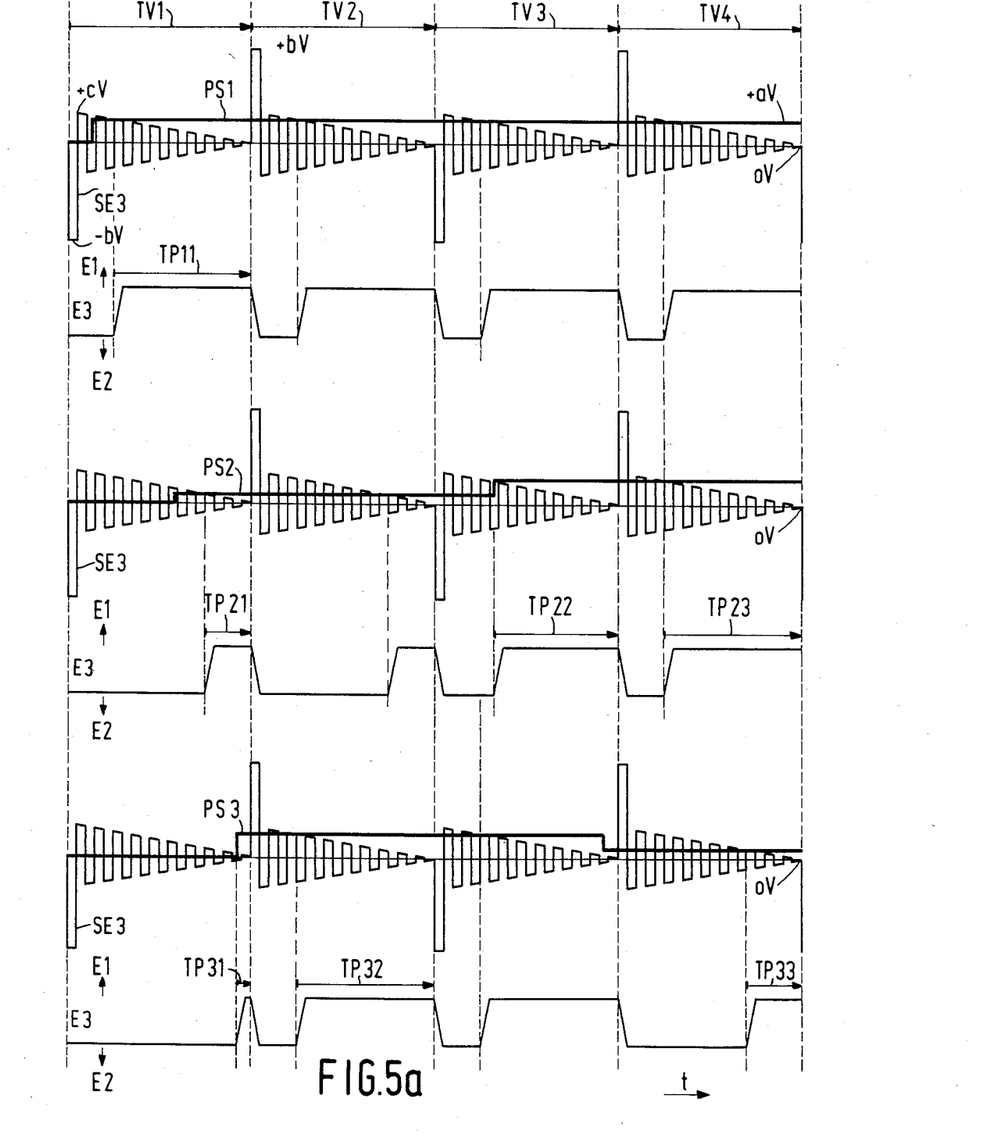
Figure 5B:
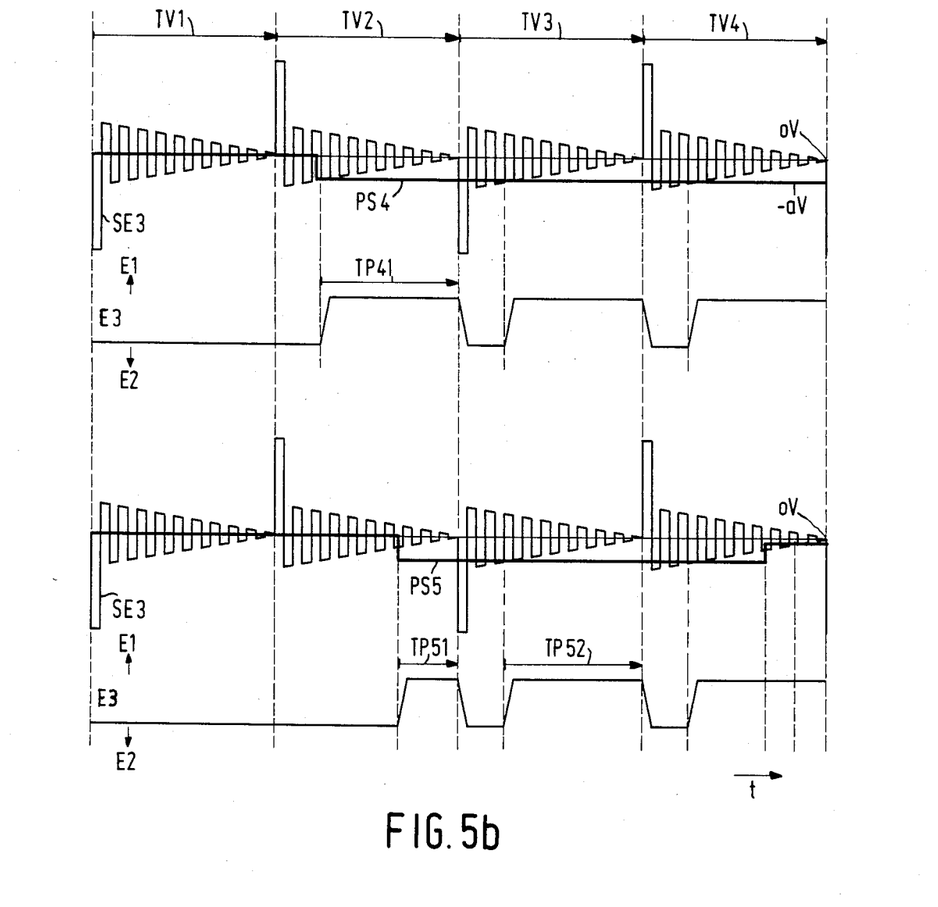

Corresponding to the image points P in FIG. 2 are picture data which are derived as samples from the picture signal PS (output 7) using the sample-and-hold circuit S/H in FIG. 1. FIG. 3 shows a circuit diagram of the circuit S/H and the control voltage generator UG which embodiment is suitable for two modes of signal processing. Signal processing with alternating voltages during field periods TV is carried out with the circuit drawn with solid lines in FIG. 3, and to illustrate the operation FIGS. 4, 5a and 5b show the corresponding time diagrams. Signal processing with direct voltages during field periods TV is performed with the circuit in FIG. 3 supplemented or modified with dashed-line connections. Corresponding to this is a more detailed embodiment of part of the circuit S/H in FIG. 6, and the time diagrams given in FIG. 7 to illustrate the operation.

Shown in FIG. 3, as in FIG. 1, are the input terminals of the control voltage generator UG with the supply of the signals VS, PS and HS. The field synchronisation signal VS is shown in FIG. 3 as a function of time with a pulse at the beginning of the field period TV. The signal VS is fed to a frequency divider 8 which delivers a signal VS' to an output. In the connections or couplings to be described the normally present signal amplifiers and processing circuits are omitted for simplicity. The signal VS' has a square waveform over two field periods TV1 and TV2. In a corresponding manner FIG. 4 shows a plot of the voltage VS' as a function of time t. FIG. 4 shows voltage diagrams over four field periods TV1, TV2, TV3 and TV4. Ground potential is indicated by OV, with respect to which, where desired, positive and negative voltages are indicated.

It appears from the signal VS' in FIG. 3 that the circuit 8 operates as a divider by 2. It will be shown that a divider by a higher factor is possible. Apart from being fed to the frequency divider 8 the signal VS is supplied to an alternating voltage generator 9 and to a generator 10 which delivers a control voltage varying over the field period, whereby a pulse is followed by a more or less linearly decreasing voltage. The generators 9 and 10 supply the respective signals S1 and S2, shown relative to a zero level shown by a dashed line. The generators 8 and 10 supply the respective signals VS' and S2 to inputs of a multiplier 11 which delivers to an output the indicated signal S3. Considered over a field period the signal S3 is a direct voltage signal, with a reversal of polarity taking place once per field period. The circuit 11 and the generator 9 supply the respective signals S3 and S1 to inputs of a multiplier 12 which delivers to the output 5 the indicated signal SE3 of FIG. 1. The generator 9 and the circuit 8 further deliver the respective signals S1 and VS' to inputs of a multiplier 13 which delivers to the output 6 the indicated signal SE1 of FIG. 1. The voltage diagrams SE1 and SE3 are shown in more detail in FIG. 4. The multiplier circuits 11, 12 and 13 may be implemented as balanced multipliers. A single multiplier circuit (11, 12) with three inputs may be present for supplying the signal SE3. The separate embodiment shown in the drawing has the advantage that a signal SE3' (FIG. 7) can be derived from the circuit 11 via the indicated dashed-line connection.

In addition to the voltage waveforms VS', SE1 and SE3, FIG. 4 shows voltage waveforms PS1, PS2, PS3, PS4 and PS5. These voltage waveforms correspond to the respective image points P1, P2, P3, P4 and P5 and give the picture signal samples, with two polarities, obtained via the sample-and-hold circuit S/H. The circuit S/H in FIG. 3 is driven from a row-driver circuit (RD) denoted by 14 and from a column-driver circuit (CD) denoted by 15, which deliver respectively the signals SR1 . . . SRn and SC1 . . . SCm. For the row selection in the crossbar system CB the line sync signal HS is fed via a resettable counter 16 to the row-driver 14. For synchronisation purposes the counter 16 has a reset input (RS) connected to the input terminal to which the field sync signal VC is supplied. With the picture signal structure shown in FIG. 2, with for example two interlaced fields forming a television frame, row selection takes place in the first field periods TV with the sequence SR1, SR3, SR4 and so on for the odd rows and in the second field periods TV with the sequence SR2, SR4, SR6 and so on for the even rows. The column driver circuit 15 is connected to an output of a resettable counter 17 an input of which is connected to an output of a high-frequency clock pulse source 18. A reset input (RS) is connected for synchronisation purposes to the input terminal to which the line sync signal HS is supplied.

For the column information supply FIG. 3 shows the input terminal with the picture signal PS connected directly and via an inverter 19 to inputs of a switching circuit 20. A switching input of circuit 20 is connected to the output of the frequency divider 8, whereby a circuit output delivers the signal sequence PS, $\overline{PS}$ every two field periods. Here the output of a periodic picture signal inverter (19, 20) corresponds to the output 7 of the control voltage generator UG in FIG. 1. The output 7 in FIG. 3 is connected to source electrodes of a row of m transistors implemented with insulated gate electrodes, of which the first and last transistors of the row are denoted by 21 and 22 respectively. The gate electrodes of transistors 21 and 22 receive the column control signals SC1 and SCm, respectively, as a result of which, during the line scan duration THS within a field scanning duration TVS, the picture information is supplied sequentially to transistor drain electrodes and to column crossbars of the crossbar system CB connected with them. In every line period TH during the field scan duration TVS one of the rows of the m crossbars of the system CB is always selected. For this purpose rows of transistors 23 ... 24 up to and including 25 ... 26, whose gate electrodes are connected to a row crossbar, are conductive sequentially per row but simultaneously in the row. The source electrodes of the columns of transistors 23 ... 25 up to and including 24 ... 26 are connected to column control bars of the system CB. The result is that picture signal samples arrive via the source-drain path of the transistors 23 ... 24 up to and including 25 ... 26 at the capacitances C connected with the drain electrodes and which are present in the circuits denoted by 27 ... 28 up to and including 29 ... 30. The capacitances are present at the junctions of the cross-bar system CB. In accordance with FIG. 3 the junction point of a transistor drain electrode and a capacitance terminal at which the picture signal sample occurs is coupled to rows of outputs 31 ... 32 up to and in including 33 ... 34 of the circuit S/H. FIG. 3 indicates that the output 31 is coupled to the second electrode E2 (11) of the first display element DE of the first row thereof. Likewise the output 32 is coupled to the second electrode E2 (1m) of the last display element DE of the first row. For the last row of display elements DE there follow the connections of the output 23 with the electrodes E2 (n1) and of the output 34 with the electrode E2 (nm). It is indicated with dashed lines that in the second embodiment of the circuit diagram in accordance with FIG. 3 the capacitances C form part of circuits 27 up to and including 30 to which the signal VS' is supplied. The signal VS' is thereby further utilised for obtaining a control voltage SE1' (FIG. 7) for the first electrode E1.

The diagrams in FIG. 4 of the signal samples PS1 up to and including PS5 which are derived from the picture signal PS and are to be fed to the corresponding second electrode E2 are explained with reference to FIG. 2. It is assumed that in an interlaced television picture, before the field period TV1 the picture signal results in a black television display screen. The picture signal samples thereby have the voltage OV, as drawn in FIG. 4. Subsequently the picture signal PS contains bright and dark information, the instants at which samples are taken being indicated by arrow heads in the signal diagrams. The picture signal sample PS1 (and PS3) assumes as shown a value of $+aV$ which corresponds for example to the peak white value in television. The sample PS2 has in the field period TV1 for example a lower positive voltage which corresponds in television to a grey value.

During the next field period TV2 the picture signal $\overline{PS}$, reversed in polarity via the circuit (19, 20) is fed to the circuit S/H, giving rise to picture signal samples PS4 and PS5 with negative voltages. The samples PS4 and PS5 with the value $-aV$ likewise correspond to the said peak white value. During the field period TV3 the positive picture signal PS is again processed, without any change taking place in the sample PS1 and with the samples PS2 and PS3 increasing and decreasing respectively. During the field period TV4 with the processing of the negative picture signal $\overline{PS}$ the sample PS4 remains unchanged and the sample PS5 shows a marked decrease.

For comparision with the $+aV$ and $-aV$ as the largest possible voltage value (peak white) for the picture signal samples PS1 up to and including PS5, some values of importance are indicated for the voltage waveforms SE1 and SE3 in FIG. 4. The voltage diagrams SE1 shows the alternating voltage with an amplitude of bV, whereby the polarity reversal takes place each field period TV. The pulses in the voltage diagram SE3 have likewise the value of $+bV$ or $-bV$, depending on the polarity reversal. After the pulses the voltage diagram SE3 shows the alternating voltage with the more or less linearly decreasing amplitude from a value of cV. The postulated decrease to OV is not required. A shorter decrease or an overshoot of the zero value accompanying an increase might occur. Threshold voltages in the electrode drives could make such a deviation desirable.

For the various voltage value it follows that $+aV$ must be smaller than $+cV$ in order that, at the beginning of a field period TV, immediately after the pulse, that picture signal sample will still fall within the envelope of the decreasing alternating voltage. The value of $+aV$ must not exceed that of $+cV$. The value of $+bV$ must be large enough relative to the value of $+aV$ to ensure at all times that, in the manner described in FIGS. 5a and 5b, the pulse operates as a reset pulse for resetting the third electrode E3 to the second electrode E2 of FIG. 1.

FIGS. 5a and 5b give time diagrams of closely cooperating voltages, such as the picture signal samples PS1 up to and including PS5, with the control voltage SE3, and of resultant displacements of the electrode E3. Not shown is the control signal SE1, which is required to be present with the same alternating voltage as the signal SE3, but with the constant amplitude of bV. Throughout the duration of the pulse in the voltage SE3 with the value of $-bV$ or $+bV$ this same value is more or less present in the signal SE1. Because of this there is hardly if any difference voltage between the electrodes E1 and E3. The difference voltage does exist between the electrodes E2 and E3, which is at the most equal to $(b+a)V$ and at least equal to $(b-a)V$. This minimum value should be sufficiently large to ensure that the difference voltage between the electrodes E2 and E3 is large enough to displace within a certain time an electrode E3 from the proximity of the electrode E1 to the electrode E2. In FIGS. 5a and 5b the electrode displacement to E1 and E2 is marked with arrows beside the time diagram for E3. The electrode displacement in the one or the other direction is considered to take a certain amount of time as indicated in the drawing. The (reset) time is considered to lie amply within the field blanking duration TVB given in FIG. 2.

The picture signal sample PS1 has the peak white level of $+aV$ at the beginning of the field period TV1. According to FIG. 5a, a short time after the sampling instant the diagram PS1 passes the envelope of the decreasing alternating voltage in the diagram SE3. When this happens there is no difference voltage between the electrodes E2 and E3, whereas a difference voltage of bV minus the signal sample value (of aV) prevails between the electrodes E1 and E3. The consequence is that the electrode E3 moves from the electrode E2 to E1. At the end of the field period TV1 the reset pulse with the value +bV appears, which resets the electrode E3 to the electrode E2. Due to the constant value of the picture signal sample PS1, the cycle of the electrode displacement is repeated in the subsequent field periods TV2, TV3 and so on. It appears that the peak white level of the picture signal sample PS1 corresponds to a reflection duration TP11 in which the reflecting electrode E3 is in the proximity of the electrode E1. The maximum reflection duration TP11 in which the diffusely reflecting electrode E3 is operative can be chosen more or less equal to the field scan duration TVS given in FIG. 2.

In the same manner the picture signal sample PS2 in FIG. 5a passes the alternating voltage envelope of the control voltage SE3, resulting in a reflection duration TP21. This reflection time is present in the field period TV2. The increase in the sample value during the field period TV3 to the peak white level results in a reflection during TP22, after which a reflection duration TP23 occurs in the field period TV4. The duration TP23 is equal to the duration TP11, the duration TP22 being a little shorter due to the effect of the sampling instant.

The picture signal sample PS3 in FIG. 5a acquires the peak white level at nearly the end of the field period TV1, which is followed by a short reflection duration TP31. This is followed by the normal reflection duration for the peak white level TP32=TP11=TP23. The decrease in the picture signal sample PS3 leads to the corresponding reflection duration TP33.

For the picture signal samples PS4 and PS5 in FIG. 5b corresponding displacements of the electrodes E3 occur. The picture signal sample PS4 with the value of −aV which occurs in the field period TV2 gives rise to the same effects a field period TV later as the positive picture sample PS1 in FIG. 5a. For the reflection duration it follows that TP41=TP11. The picture signal sample PS5 acquires the value of −aV at an instant at which the displacement of the electrode E3 immediately begins, resulting in a shortened reflection duration TP51. This is followed by a reflection duration TP52=TP11. FIG. 5b shows that during the field period TV4 the picture signal sample PS5 acquires a value that falls within the envelope of the alternating voltage of the control signal SE3. The electrode E3 thereby undergoes no displacement from the electrode E1 since it is held there by the alternating control voltage SE1 (FIG. 4).

It appears from the foregoing that the first, second and third electrodes E1, E2 and E3 in each display element DE of FIG. 1 form part of a pulse modulator (UG, DE) which further comprises a part of the control voltage generator UG. Without any further processing of the picture signal samples PS1 up to and including PS5 in FIG. 4 the choice of the supply of the control voltages SE1 and in particular SE3 to the electrodes E1 and E3, respectively, provides for the pulse duration modulation effect with the displacements of the electrode E3 drawn in FIGS. 5a and 5b. In practice there will be a voltage band at the alternating voltage envelope, from which band the electrode displacement will be triggered.

The reflection durations TP22, TP31 and TP51 in FIGS. 5a and 5b, occurring during one field period TV, which are too short for the relevant picture signal sample, cause no perceptible distortion in a television picture display.

It appears from FIG. 4 that the control voltages SE1 and SE3 with the alternating voltage and the polarity reversal per field period for the voltage SE3 in particular have no direct voltage component differing from OV. Here the polarity reversal for the voltage SE3 requires a reversal of the polarity of SE1. The picture signal samples PS1, PS2 and PS3 have a positive direct voltage component, whereas the samples PS4 and PS5 have a negative direct voltage component, which is obtained by means of the periodic picture signal inverter (19, 20) in FIG. 3. If it is assumed that the picture information contents of two successive field periods TV are approximately equal to each other, that is to say are sufficiently correlated and subordinate changes of information in time, then the positive and negative picture signal samples, alternating per field period, will result in a negligible direct voltage component. Apart from the correlation in time, there is also a spatial correlation whereby image contrasts extend over a certain distance. In interlaced television a displacement takes place over one line in the field scanning direction over two successive field periods TV. The possible occurrence of charge accumulation in the fluid F of the matrix panel EFD in FIG. 1 can then, due to charge equalisation in the fluid F, remain below a threshold valve above which electrolysis occurs and/or the displacement of the electrode E3 is affected. With the assumption described, it is sufficient that at least the control voltages SE3 and SE1 have the reversal of polarity. If the assumption does not hold, the picture signal PS1 up to and including PS5 in FIG. 4 can also be given a polarity reversal, receiving it at the same instance as the control voltages SE1 and SE3 or at instants that occur one field period TV later than the sampling intervals. In the case of non-interlaced television the periodic picture signal inverter (19, 20) in FIG. 3 provides in each field period TV the polarity reversal of the picture signal samples of each display element DE in FIG. 1.

According to FIG. 4, the polarity reversal of at least the two control voltages SE3 and SE1 takes place each field period TV. Instead of this, a polarity reversal after a number of field periods TV may be envisaged. For interlaced television a polarity reversal is mentioned by way of example per frame period which comprises a specific number of field periods. The choice of the number of field periods after which the polarity reversal periodically follows depends on the magnitude of the permitted brief charge accumulation which is periodically eliminated. A required period of polarity reversal can be implemented by a simple adaptation of the frequency divider 8.

The application as shown in FIG. 4 of the constant and the more or less linearly decreasing alternating voltage in the control signals SE1 and SE3 respectively has the effect that, in the manner described in both FIG. 5a and FIG. 5b, the positive and negative picture signal samples PS1 up to and including PS5 cause displacement of the electrode E3 when the envelope of the decreasing alternating voltage is passed by the sample value. In practice there is a voltage band here with the envelope from which the electrode displacement is triggered.

Figure 7:
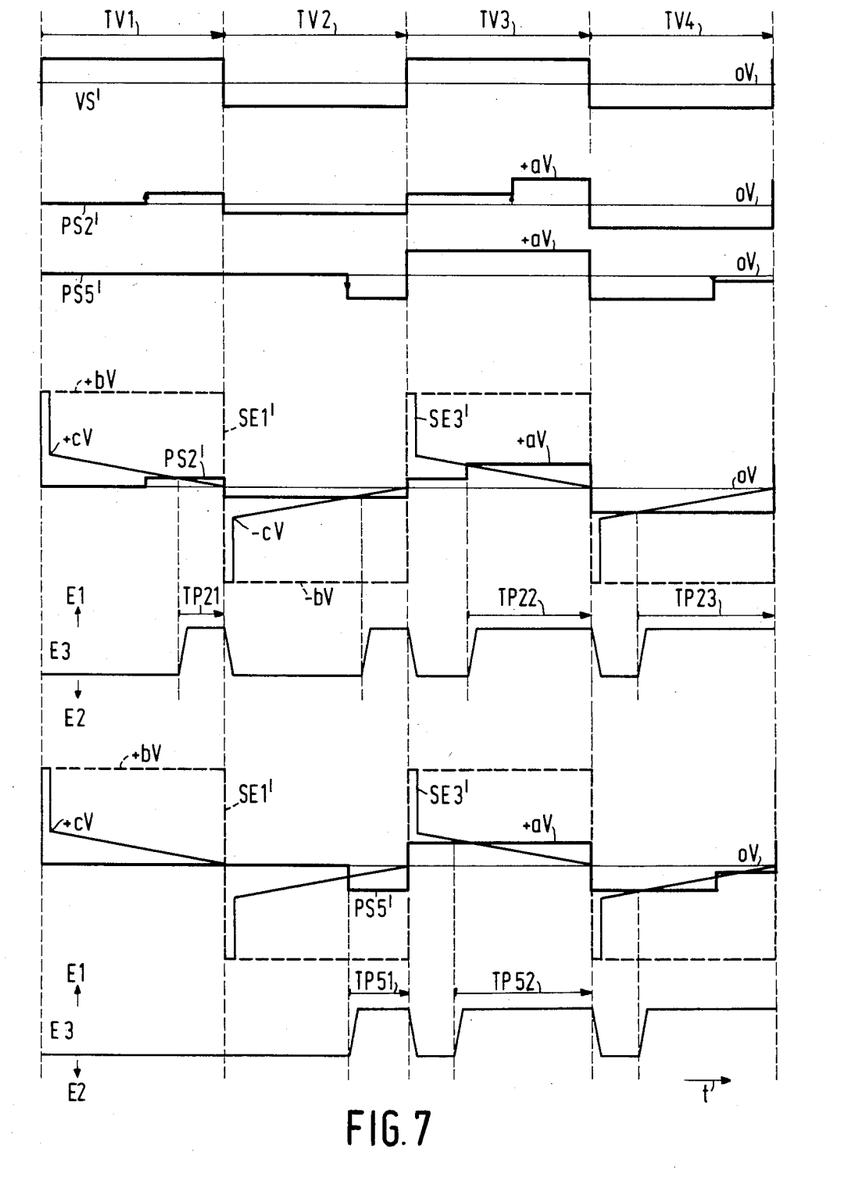
FIG. 7 shows corresponding time diagrams of cooperating voltages and of resulting electrode displacements.

In the embodiment of the control voltage generator UG and of the sample-and-hold circuit S/H, drawn by dashed lines in FIG. 3, no alternating voltage, which might be undesirable, is applied over the field period TV. In this case the signal VS' is applied as a switching signal to the circuits 27 up to and including 30, a detailed embodiment of which is shown in FIG. 6. FIG. 7 gives a plot versus time of the signals VS', PS2', PS5', SE1', SE3' and the corresponding electrode displacement diagrams E3. The diagrams of the control voltages SE1' and SE3' in FIG. 7 correspond to the respective output signals VS' and S3 of the frequency divider 8 and the multiplier 11, so that these control voltages can be drived therefrom. Of the five picture signal samples given in FIG. 4 only two are drawn in FIG. 7. Compared with the samples PS2 and PS5 in FIG. 4 the samples PS2' and PS5' in FIG. 7 have a polarity reversal per field period. For the implementation of such a polarity reversal, reference is made to the circuit diagram in accordance with FIG. 6.

In FIG. 6 the electrode E2 is connected to an output (31–34) of the corresponding circuit (27–30) with the capacitance C. Capacitance terminals for C are indicated by +C and −C, and it will be shown that the terminal +C and the terminal −C carry respectively at a positive and a negative voltage or the voltage 0V. The capacitance terminal +C is connected to a drain electrode of a transistor 40, a source electrode of which is connected to a terminal carrying a constant direct voltage of more or less +aV. The capacitance terminal −C is connected to a source electrode of a transistor 41, a drain electrode of which is connected to a terminal carrying a constant direct voltage of more or less −aV. The voltage terminals form part of a voltage source, not detailed in the drawing, of which another terminal is connected to ground with the voltage of 0V. The capacitance terminals +C and −C are further connected respectively to the drain and source electrodes of a transistor 42 and 43, respectively. Insulated gate electrodes of the transistors 40 and 43 are interconnected and receive the voltage VS'. Gate electrodes of the transistors 41 and 42 are interconnected and receive via an inverter 44 the inverted voltage VS'. The result is that during the field periods TV1 the transistors 40 and 43 may be conductive, while the transistors 41 and 42 are blocked. Conversely, during the field periods TV2 the transistors 41 and 42 may be conductive, while the transistors 40 and 43 are blocked. Voltage drops during transistor conduction are disregarded for the sake of simplicity. The source electrode of transistor 42 and the drain electrode of transistor 43 are interconnected and are coupled to the input and the output (31–34) of the circuit (27–30). The capacitance C is present in this case in a switching circuit (40–44) so that during the field period TV1 and TV2, respectively, the respective capacitance terminals −C and +C are connected to the circuit input and output, as the case may be.

To elucidate the operation of the picture signal sample-and-hold circuit S/H implemented with the circuits (27–30) in accordance with FIG. 6, the following table is given:

TABLE

| Field period TV1 | Voltage across C | Field period TV2 | Voltage across C | Field period TV1 |
|---|---|---|---|---|
| supply/removal PS2' | | removal PS2' | | supply/removal |
| 0V | ±aV | 0V | | |
| $+\frac{1}{4}$ aV | $\pm\frac{3}{4}$ aV | $-\frac{1}{4}$ aV | | |
| +aV | 0V | −aV | | |
| | | supply/removal PS5' | | removal PS5' |
| | | 0V | ±aV | 0V |
| | | $-\frac{3}{4}$ aV | $\pm\frac{1}{4}$ aV | $+\frac{3}{4}$ aV |
| | | −aV | 0V | +aV |

It appears from the table that the supply/removal of a positive picture signal sample (PS2') of $+\frac{1}{4}$ aV or +aV during the field period TV1 leads to the removal during the next field period TV2 of the polarity-reversed sample $-\frac{1}{4}$ aV or −aV. At the same time, via the periodic picture signal inverter (19, 20) in FIG. 3, a negative picture signal sample (PS5') is supplied and removed in the other half of the circuits, and this gives during the next field period TV1 (=TV3 in FIG. 7) a removal with positive picture signal samples. This reversal of the polarity of the samples PS2' and PS5' fits with the diagrams in FIG. 7. Instead of applying the periodic picture signal inverter (19, 20) it would be possible to split these circuits (27–30) into even and odd rows each supplied with its own switching signal, but this solution is regarded as less advantageous, partly because of the leads, which have to be insulated from each other, carrying the separate switching signals.

From FIG. 3 with the dashed-line connections there follow the control voltages SE1' and SE3' shown in FIG. 7. Considered over a field period TV, there are direct voltages with the polarity reversal between the field periods TV. When the picture signal samples PS2' passes the linearly decreasing part of the controlled direct voltage SE3', the displacement of the electrode E3 is initiated within a particular voltage band, whereby the displacement diagrams E3 in FIGS. 7 and 5a are identical. The same applies to the picture signal sample PS5' and to the corresponding displacement diagrams E3 in FIG. 7 which is equal to that of FIG. 5b.

To illustrate voltages and frequencies that may be used in a possible embodiment of a picture, display device (EFD, UG) in accordance with the invention, the following values are given by way of example:
Voltage bV=40 V. Voltage cV=6 V. Voltage aV=5 V.
Frequency of the alternating voltage generator 9 equal to 0.5 kHz and of the RF clock pulse source 18 equal to 10 MHz.

The device (EFD, UG) can for example operate in accordance with an interlaced black and white or colour television standard where the number of lines is 625 or 525 per frame and the field frequency is 50 Hz or approximately 60 Hz. The bandwidth of the picture signal extends for example up to above 5 MHz.

What is claimed is:
1. Electroscopic fluid picture-display device for displaying television images comprising:
   a plurality of display elements formed in a matrix of rows and columns, each display element including fixed first and second electrodes, and a third electrode which moves between said first and second electrodes in a fluid medium in response to a volt- age difference between said third and first and second electrodes;

a sample-and-hold circuit for receiving a video signal to be displayed, having a plurality of outputs forming a matrix, each connected to said second electrode of each said display element to provide picture voltage samples; and a control voltage generator connected to each said third electrode supplying a control voltage which varies over each field period of said television images, said control voltage generator providing a periodic reset pulse to said third electrode, placing said third electrode at the same potential as said second electrode, and providing between said reset periods a linearly decreasing control voltage, said control voltage generator providing a constant control voltage potential to each said first electrode, and means for periodically reversing the polarity of voltage of at least two of said electrodes on a periodic basis of at least one time per field period.

2. Electroscopic picture-display device as claimed in claim 1, wherein the linearly decreasing control voltage potential and the constant control voltage are both an alternating voltage over the field period with the same frequency and polarity.

3. Electroscopic picture-display device as claimed in claim 1, wherein the linearly decreasing control voltage potential and the constant control voltage are both a direct voltage over the field period, and the sample-and-hold circuit provides the picture voltage samples with said periodic reversal of polarity taking place at least once per field period.

4. Electroscopic picture-display device as claimed in claims 1, 2 or 3, wherein the sample-and-hold circuit is preceded by a periodic picture-signal inverter which periodically reverses the polarity of said picture voltage samples at least once per field period.

5. Electroscopic picture-display device as claimed in claim 1, wherein the sample-and-hold circuit is provided with a crossbar system of connections crossing each other in rows and columns, which operates with said row selection and sequential supply of the picture voltage samples to the columns, whereby capacitances present at the crosspoints of said rows and columns and which carry the picture voltage samples are each coupled by an output of the sample-and-hold circuit to the second electrode of a corresponding display element.

6. Electroscopic picture-display device as claimed in claim 1 wherein the control voltage generator contains a frequency divider which is provided with an input for receiving a television field synchronizing signal and with an output for supplying a signal with said periodic polarity reversal which occurs at least once per field period.

7. Electroscopic picture-display device as claimed in claim 6, wherein the control voltage generator is provided with an alternating voltage generator, and a generator for supplying the control voltage that varies over the field period, said generators having television field synchronization, a multiplier with inputs coupled to the outputs of the alternating voltage generator and the frequency divider, having an output coupled to each said first electrode of the display elements, and a further multiplier with inputs that are coupled to the outputs of the generator for supplying the control voltage that varies over the field period, to the frequency divider and to the alternating voltage generator, and having an output coupled to each said third electrode of the display elements.

8. Electroscopic picture-display device as claimed in claims 3, or 5, wherein said capacitances are each present in a corresponding switching circuit by means of which one or the other capacitance terminal with the picture-voltage sample of reversed polarity is coupled to the corresponding output, which switching circuit, for the purpose of receiving a switching signal having said polarity reversal period, is coupled to an output of said frequency divider.

9. Electroscopic picture-display device as claimed in claim 3, wherein the control voltage generator comprises a generator for supplying the decreasing control voltage that varies over the field period, which generator is synchronized with the television field, and a multiplier is provided with inputs that are coupled to the outputs of said generator, and the frequency divider output, the output of the frequency divider being coupled to the first electrode of the display elements and the output of the divider being coupled to the third electrode of the display elements.

* * * * *